United States Patent
Leickel et al.

(12) 
(10) Patent No.: US 6,580,918 B1
(45) Date of Patent: Jun. 17, 2003

(54) CELLULAR TELECOMMUNICATIONS SYSTEM

(75) Inventors: Torsten Leickel, Herne (DE); Jens Jakobsen, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/121,623

(22) Filed: Jul. 23, 1998

(30) Foreign Application Priority Data

Aug. 5, 1997 (DE) .......................... 197 33 857

(51) Int. Cl.[7] .............................. H04B 7/00; H04B 1/38
(52) U.S. Cl. ...................... 455/511; 455/562; 370/529
(58) Field of Search ............................... 455/426, 462, 455/463, 464, 465, 511, 515, 561, 562; 370/345, 347, 442, 528, 529

(56) References Cited

U.S. PATENT DOCUMENTS

| | | | |
|---|---|---|---|
| 5,243,598 A | * 9/1993 | Lee | 370/332 |
| 5,257,399 A | * 10/1993 | Kallin et al. | 455/434 |
| 5,396,653 A | 3/1995 | Kivari et al. | 455/88 |
| 5,430,740 A | 7/1995 | Kivari et al. | 371/37.1 |
| 5,459,873 A | * 10/1995 | Moore et al. | 370/334 |
| 5,533,027 A | * 7/1996 | Akerberg et al. | 370/195.1 |
| 5,564,121 A | * 10/1996 | Chow et al. | 455/25 |
| 5,570,353 A | 10/1996 | Keskitalo et al. | 370/18 |
| 5,577,024 A | 11/1996 | Malkamaki et al. | 370/18 |
| 5,606,548 A | 2/1997 | Vayrynen et al. | 370/252 |
| 5,628,052 A | * 5/1997 | DeSantis et al. | 370/334 |
| 5,678,186 A | * 10/1997 | Lee | 455/422 |
| 5,708,656 A | 1/1998 | Noneman et al. | 370/320 |
| 5,726,981 A | 3/1998 | Ylitervo et al. | 370/332 |
| 5,745,503 A | 4/1998 | Kuusinen | 371/37.1 |
| 5,764,632 A | 6/1998 | Ylitervo | 370/337 |
| 5,765,099 A | * 6/1998 | Georges et al. | 455/318 |
| 5,790,534 A | 8/1998 | Kokko et al. | 370/335 |
| 5,794,156 A | 8/1998 | Alanara | 455/517 |
| 5,930,726 A | * 7/1999 | Fujita | 455/555 |
| 5,946,622 A | * 8/1999 | Bojeryd | 455/444 |
| 5,983,118 A | * 11/1999 | Lee | 455/562 |
| 5,991,613 A | * 11/1999 | Euscher et al. | 455/562 |
| 6,023,625 A | * 2/2000 | Myers, Jr. | 455/503 |
| 6,078,571 A | * 6/2000 | Hall | 370/331 |
| 6,078,823 A | * 6/2000 | Chavez et al. | 455/562 |
| 6,195,567 B1 | * 2/2001 | Lee | 455/562 |
| 6,351,463 B1 | * 2/2002 | DeSantis et al. | 370/331 |

FOREIGN PATENT DOCUMENTS

| | | | | |
|---|---|---|---|---|
| DE | 43 28 808 A1 | | 3/1994 | |
| DE | 92 14 967.7 | | 4/1994 | |
| EP | 0213780 | * | 3/1987 | |
| EP | 0705520 | * | 10/1997 | |
| EP | 0 855 808 A2 | * | 7/1998 | ............ H04B/7/36 |
| JP | 11136735 | * | 5/1999 | ............ H04Q/7/38 |

OTHER PUBLICATIONS

"Struktur des DECT-Standards", pp. 23–29.
"Application Of Microcellular Techniques For The Provision Of Mobile Services From the Fixed Network", Harvey ey al., pp. 57–63.

* cited by examiner

*Primary Examiner*—Charles N. Appiah
(74) *Attorney, Agent, or Firm*—Perman & Green, LLP

(57) ABSTRACT

The invention relates to a cellular telecommunications system having n cells (1,2), each of which is assigned an antenna (4,5) via which a base station (3) can transmit and receive, all n cells being assigned only one common base station with n antennas which can be switched over, and n being $\geq 2$.

1 Claim, 7 Drawing Sheets

CELLULAR TELECOMMUNICATIONS SYSTEM

DESCRIPTION

Figure 1:
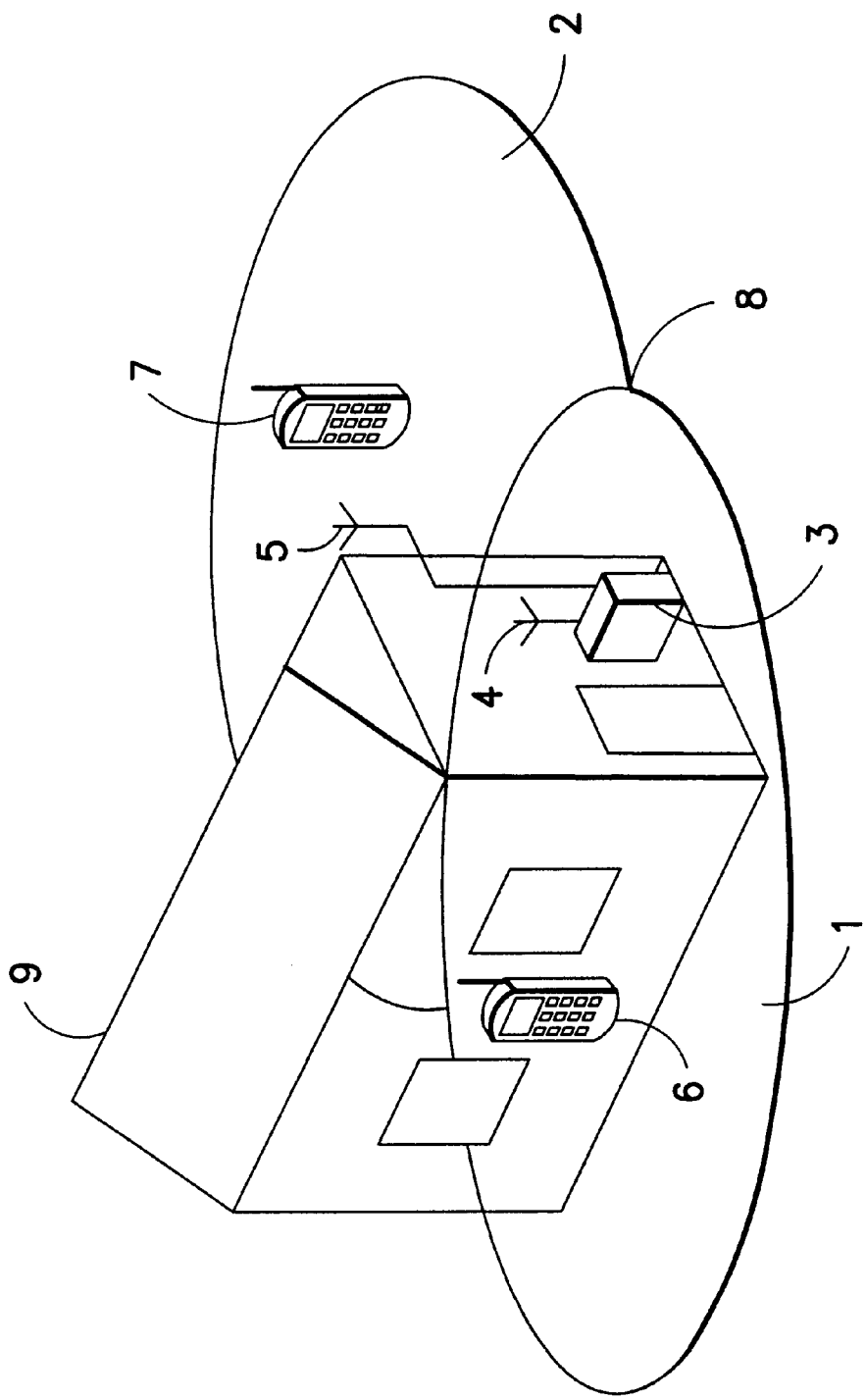

The invention relates to a cellular telecommunications system in accordance with the preamble of Patent claim 1.

Cellular telecommunications systems which are already known are generally more cost-intensive the bigger their transmission/reception range, i.e. the more cells there are in the cellular telecommunications system. This is primarily due to the fact that each individual cell is assigned its own base station. Therefore, the greater the area which is to be covered by a cellular telecommunications system, the more base stations are necessary. Consequently, in contemporary cellular telecommunications systems the base stations constitute one of the main cost factors.

The object of the invention is to provide a more cost-effective cellular telecommunications system with which a greatest possible transmission/reception range can be made available.

The means of achieving the object which has been set can be found in the characterizing part of Patent claim 1.

A cellular telecommunications system in accordance with the invention is characterized by the fact that all n cells are assigned only one common base station with n antennas which can be switched over, the number n of cells being greater than or equal to two.

According to a preferred exemplary embodiment of the invention, the telecommunications system has precisely two cells, the assignment of the cells to the common base station being carried out by means of a switch which is contained in the base station and via which the respective antennas are connected to a RF (Radio Frequency) unit contained in the base station. In this way, it is possible to make a saving of one base station in comparison with conventional telecommunications systems, which has positive effects on the costs.

By making an appropriate selection of the number of antennas and of the switch, it is possible, as an alternative, also to assign more than two cells to one base station in each case.

According to one development of the invention, the switch is controlled by a microcontrol unit (MCU) contained in the base station. The switch can be controlled here in accordance with an algorithm which is implemented, for example, as software in the MCU. In this way, the control of the switch can be adapted relatively easily and quickly to different demands.

According to another development of the invention, information which is supplied by the MCU and which specifies in which time slot and at what frequency the RF unit has to transmit data is buffered in a BMC (Burst Mode Controller) before it is passed on to the RF unit. It is necessary to buffer the data because, depending on the position of the switch, the data can be passed on to the RF unit only in corresponding time slots.

So that the MCU can carry out the abovementioned functions, according to one development of the invention said unit is coupled to memory modules which may be designed, for example, as fixed and/or variable ROMs (Read Only Memory) and/or RAMs (Read Access Memory), the components which are contained in the base station being synchronized by means of a common clock generator. This ensures that the correct data are transmitted via the correct antenna in the corresponding time slots.

According to yet another refinement of the invention, a first antenna is arranged in a building and a second antenna is arranged outside the building. In this way, the transmission/reception range of the telecommunications system can easily be extended. Consequently, it is possible, for example, also to set up a connection between two mobile stations, one of which is located in the interior of the building and the other in the garden, for example.

Telecommunications systems of the abovementioned type can, for example, be operated according to the DECT Standard. These may be cellular or so-called cordless systems.

According to the DECT Standard, it is possible to transmit both voice and data signals. Consequently, it is possible to set up cellular data networks which are based on the DECT Standard and which permit the subscriber to move freely within various cells without, for example, the call which is currently being made being interrupted. Voice and data signals are transmitted here by means of so-called bearers (see DECT Standard for more details).

In order to prevent a call being interrupted, a call is, when necessary, transferred from one cell into another, which is customarily also referred to as handover, (changing over to another channel), specifically also as intercell handover.

A handover can also be carried out within a cell (intracell handover) if the connection quality is, for example, degraded as a result of common channel interference. Here, a change-over of the radio channel takes place within a cell with the same base station being retained. In this context, the change-over of the channel can consist in changing over between frequencies or between time slots.

In the abovementioned types of handover, a channel change is seamless, that is to say without the connection being interrupted. This is achieved by virtue of the fact that the old bearer is not released until the new one has already been set up. Consequently, two bearers must be operated in parallel for a short time, which leads to an increased loading of the system. However, in order to protect the resources in a telecommunications system, the number of handovers must, on the one hand, be kept as low as possible, while, on the other hand, any desired reduction in the number of handovers is not possible since otherwise the desired connection quality cannot be maintained.

In order, to be able to utilize fully the power of, for example, a two-cell telecommunications system according to the DECT Standard, so-called dummy bearers (DB) must be transmitted in each cell via respective antennas.

So the mobile stations know that a call has arrived for them, they must activate their receiver in a specific time slot and at a specific frequency in order to determine whether there is information for them. Customarily, they receive this information via the broadcast channel which is usually transmitted via the dummy bearer (DB).

In order to avoid the dummy bearer being subject to interference, it must be transmitted on various channels, i.e. at a different frequency and/or in another time slot.

If, for reasons of cost, a so-called low-cost synthesizer is used in a base station, it is not possible with such a synthesizer to change the frequency in two successive time slots since the synthesizer is too slow. This means that, instead of the 24 time slots defined in the DECT standard, it is possible to use only every second time slot. Consequently, when a "low-cost" synthesizer is used, only six time slots are used in the downlink (base station—mobile station) and six in the uplink (mobile station—base station), respectively.

If it is then desired to reduce the number of base stations in the abovementioned example from two to one and to transmit the respective bearers into both cells via the remaining base station in which a slow synthesizer is being used, in order to set up the bearers (traffic bearers and dummy bearers) there are therefore only six time slots left for connections from the base station to the mobile station and from the mobile station to the base station. In the case of a standard configuration of a telecommunications system it should be possible to make telephone calls to the outside (line call) from a cell using at least one mobile station, while being able at the same time to set up a connection to a mobile station of another cell (inter-call) using a different mobile station in the cell. Furthermore, a handover must also be possible in each cell, it being possible for further mobile stations to be in stand-by mode. As a result, the following number of bearers results for a telecommunications system according to the DECT Standard with two cells and "low-cost" synthesizer:

| | | |
|---|---|---|
| 1. | Transmission of a dummy bearer in the first cell | 1 bearer; |
| 2. | Transmission of a dummy bearer in the second cell | 1 bearer; |
| 3. | Call between two extension line devices | 2 bearers; |
| 4. | Call to the outside via a trunk line | 1 bearer; |
| 5. | Handover bearer for each cell | 2 bearers; |
| 6. | Total | 7 bearers; |

This means that it is not possible to implement a two-cell telecommunications system according to the DECT Standard using only one base station if a "low-cost" synthesizer is used in the base station.

Of course, it will be possible to conceive of using in this case a faster synthesizer in which twelve channels can be used in the uplink and in the downlink, respectively. However, such a synthesizer is extremely expensive.

If, on the other hand, a telecommunications system with more than two cells is considered, the abovementioned problems relating to channel capacity arise even when a high-speed synthesizer is used.

Therefore, in a development of the invention, a bearer transmitted on a first channel contains information relating to the position of a second channel so that the mobile stations of the respective cell can set themselves to the second channel using this information. In this context, position means information relating to the frequency and time slot. In this way, a "seamless handover", for example, can be implemented in which there is no interruption in the call during a handover (intercell or intracell).

According to yet another refinement, the position information on the first channel is transmitted parallel to a traffic bearer (TB) which has been set up on the second channel. The mobile stations of the cellular telecommunications system are thus selectively informed as to which time slot and which frequency they should set themselves to in order to receive broadcast information. The broadcast information contains information relating to when the mobile stations must activate their respective receiver (at which frequency and in which time slot). As a result, the mobile stations do not have to search through all the channels individually for broadcast information, which reduces the power consumed by the mobile stations considerably.

According to a further development of the invention, the position information is transmitted via a dummy bearer which is switched off after a predetermined time has elapsed. As a result, the channel seized by the dummy bearer is released and can be used for other purposes, for example for setting up a further traffic bearer.

According to one preferred embodiment, the dummy bearer is switched off after 640 milliseconds. During this time, all the mobile stations set to the dummy bearer are informed about a change of channel. If no change of the broadcast channel is expected, the mobile stations activate their receiver every 640 milliseconds, which corresponds to the length of four multiframes, which are each 160 milliseconds long. Since the base station broadcasts the broadcast channel in each multiframe in each case, it is ensured that all the mobile stations are informed about the new channel before the dummy bearer is switched off.

Alternatively, the dummy bearer (DB) may also be switched off only after any other desired appropriate period of time. Thus, the dummy bearer may be maintained, for example, until the physical channel seized by it is required for other purposes, for example to set up a further traffic bearer. In this way, all the available channels of a DECT telephone system are used to an optimum degree.

According to a further embodiment of the telecommunications system according to the invention, only the dummy bearer is transmitted on the first channel. Consequently, the broadcast information transmitted to the mobile stations is transmitted via a permanent dummy bearer as long as no traffic bearer (TB) has been set up. After at least a first traffic bearer (TB) has been set up, all the mobile stations synchronized on the dummy bearer (DB) receive broadcast information relating to the change of channel via said dummy bearer (DB). In this way, the mobile stations can be selectively informed as to which time slot and which frequency they must set themselves in order, for example, to receive further broadcast information.

This broadcast information may be contained, for example, in the newly set-up traffic bearer to which all the mobile stations now set themselves, even if they do not require a traffic bearer themselves at the moment. As a result, the channel seized by the dummy bearer is released immediately after a first connection of a mobile station is set up.

According to a different embodiment of the telecommunications system according to the invention, a traffic bearer (TB) is transmitted on the first channel and, after the traffic bearer has been set up on the second channel, said first traffic bearer (TB) is transformed into the dummy bearer. The conversion of a traffic bearer into a dummy bearer can be achieved, for example, by stopping only the voice transmission (decoupling of the U plane). Stopping the voice transmission is recommended since, otherwise, the other mobile stations set to the traffic bearer may possibly be disrupted.

According to yet another embodiment of the telecommunications system according to the invention, when the last traffic bearer (TB) is switched off it is converted into a permanent dummy bearer (DB) so that only voice transmission has to be stopped on this channel. In this case, too, it is not necessary for the mobile stations to scan the channels for the broadcast channel.

Furthermore, channels of cells may be assigned in each case to other cells. As a result, it is possible to avoid temporary channel bottlenecks of a cell as a result of unused channels of a different cell, unused channels being concealed in the other cell.

Figure 2:
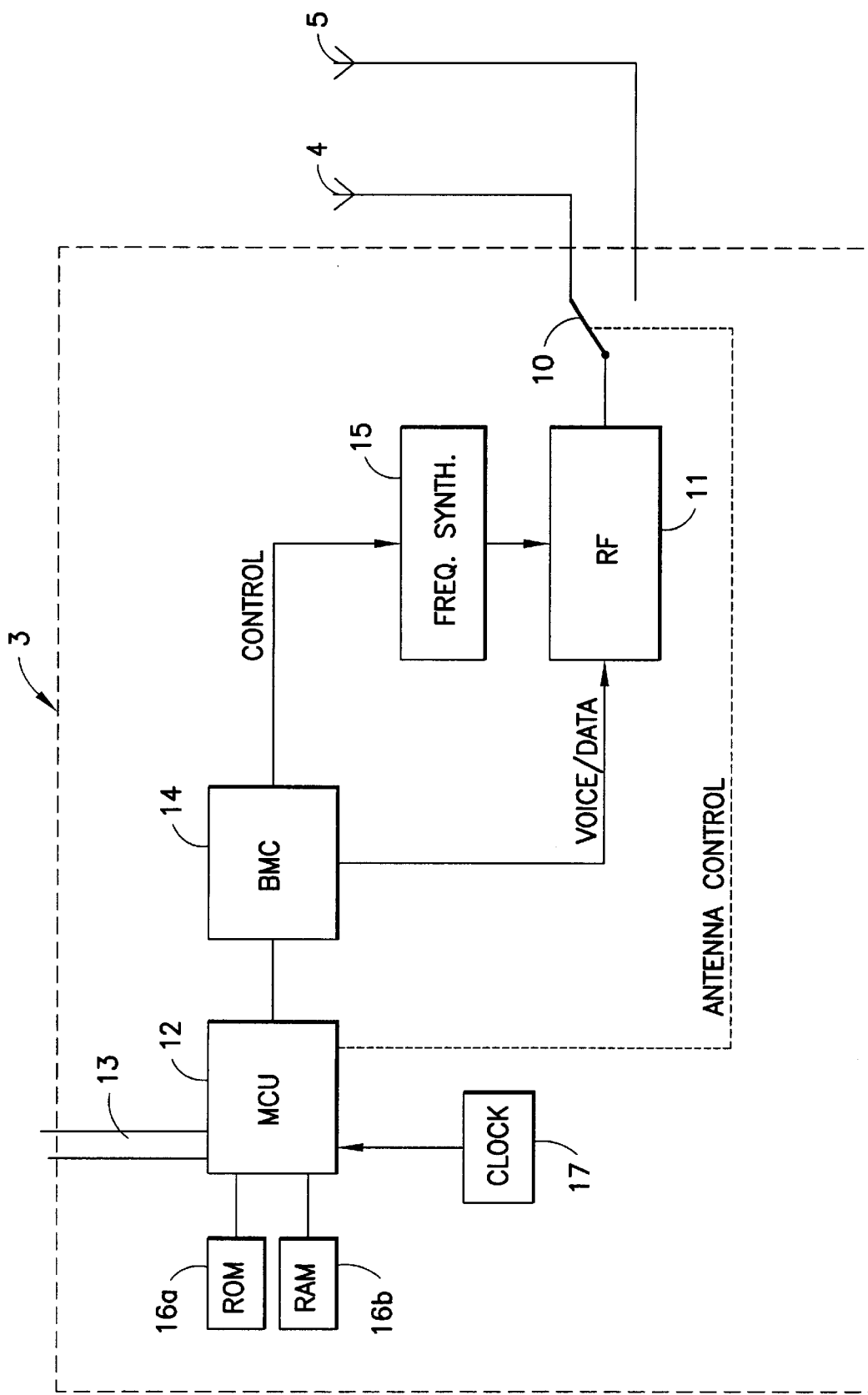
Figure 3:
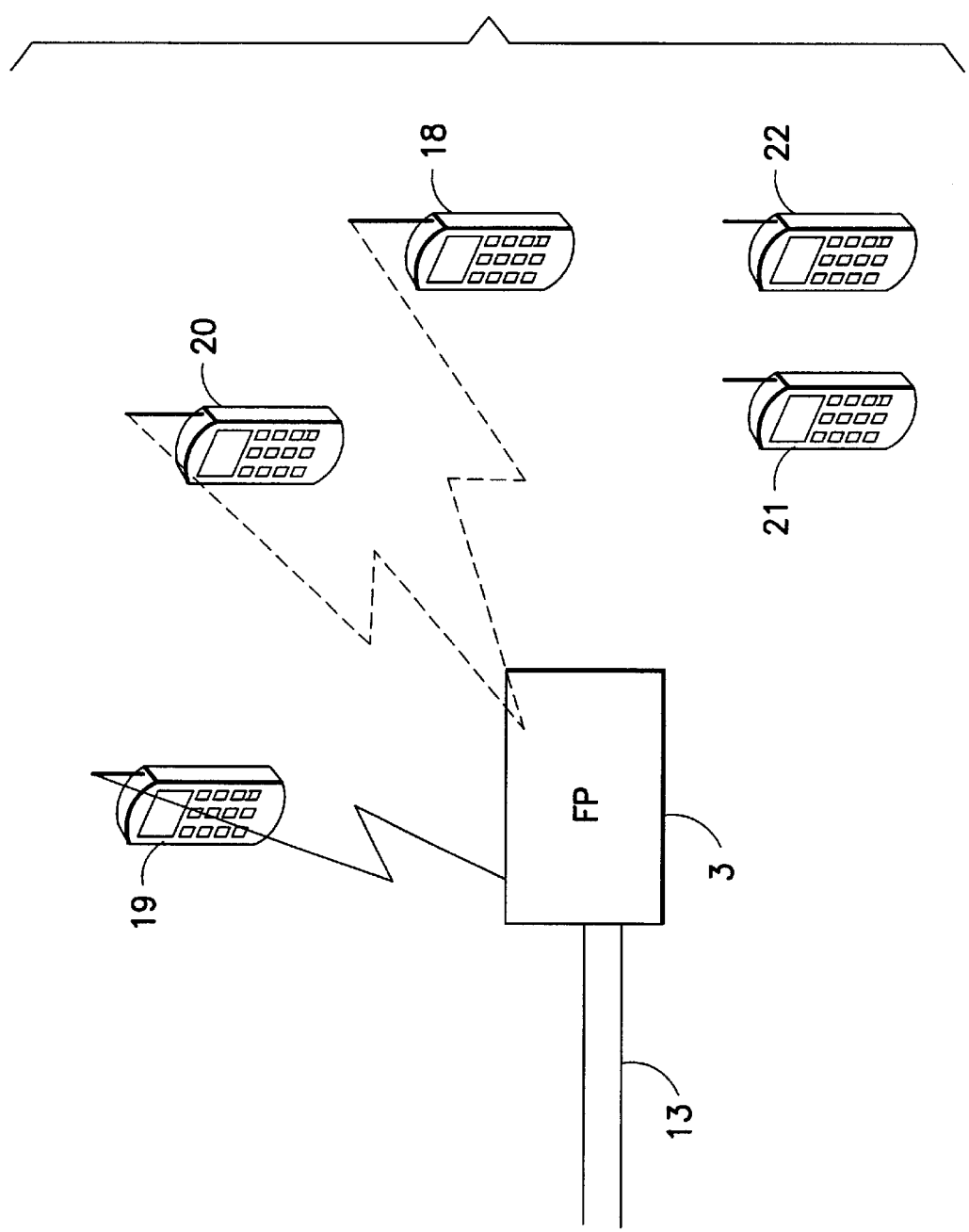
Figure 4A:
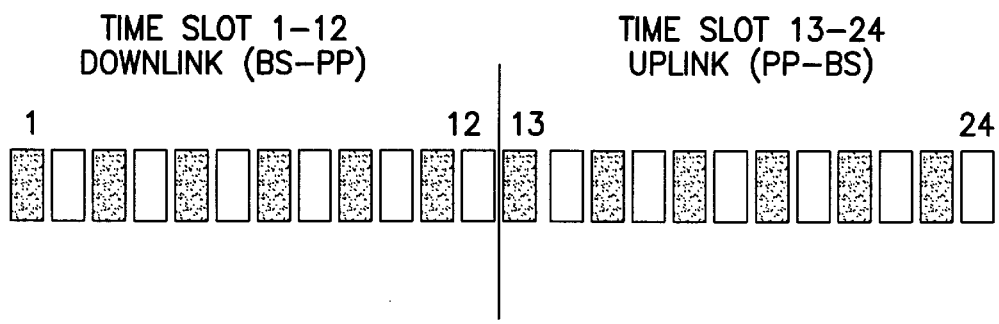
Figure 4B:
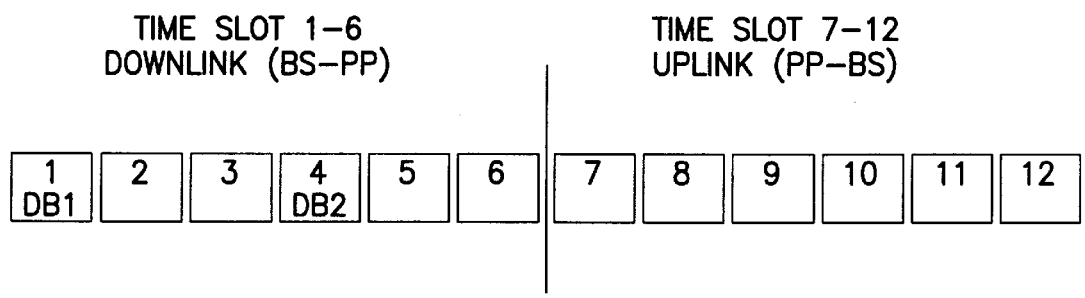
Figure 5:
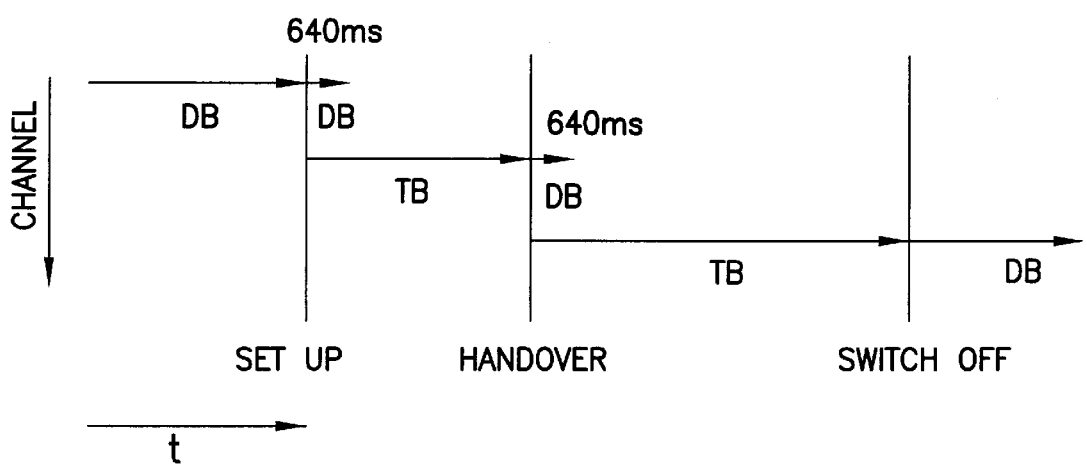
Figure 6:
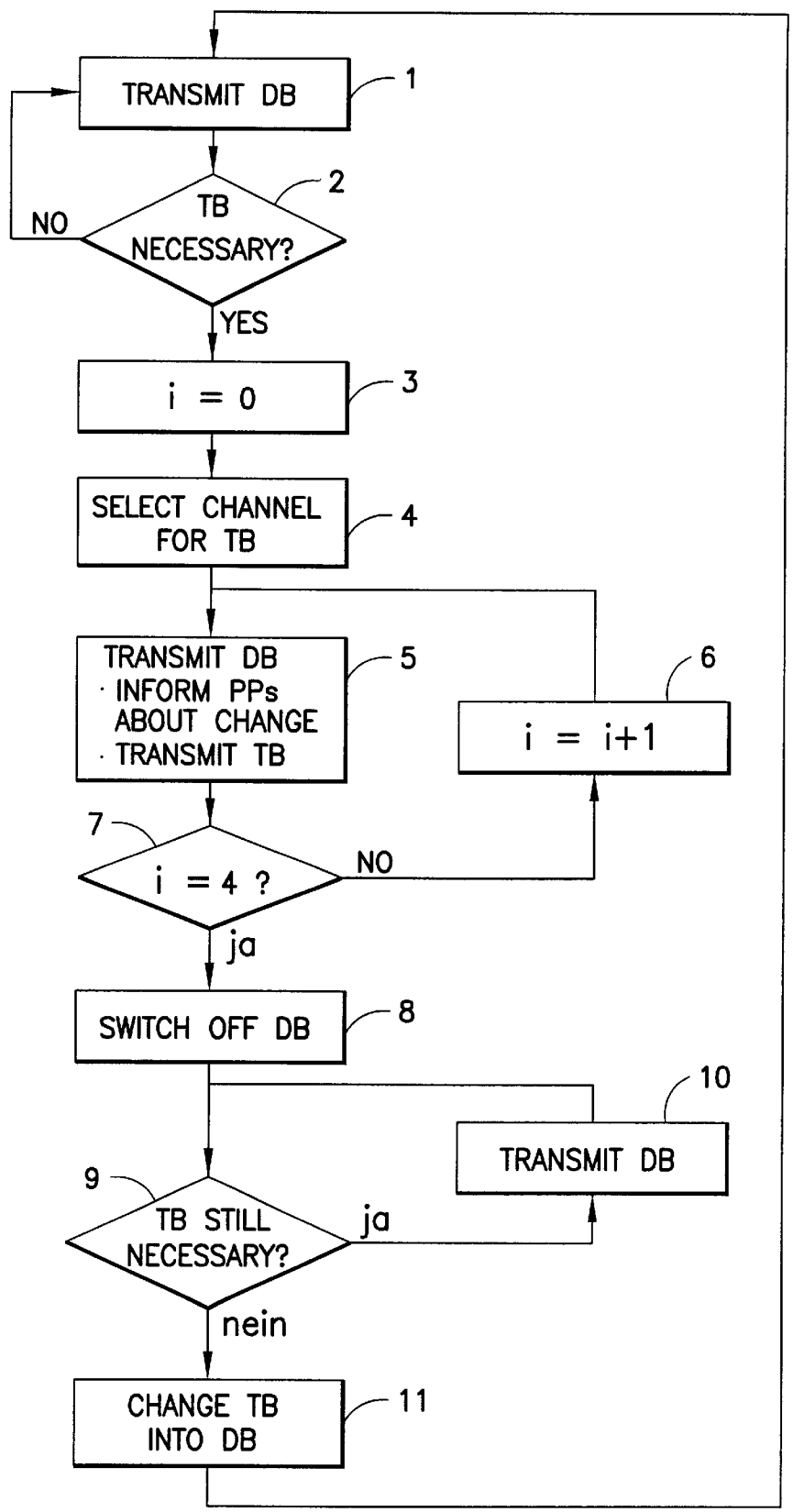
Figure 7A:
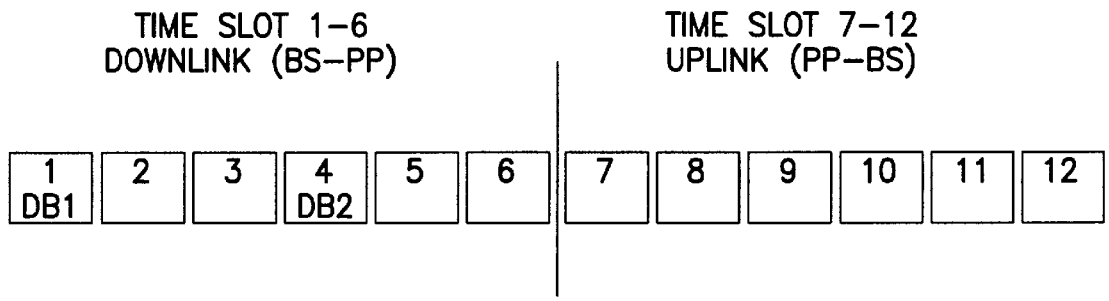
Figure 7B:
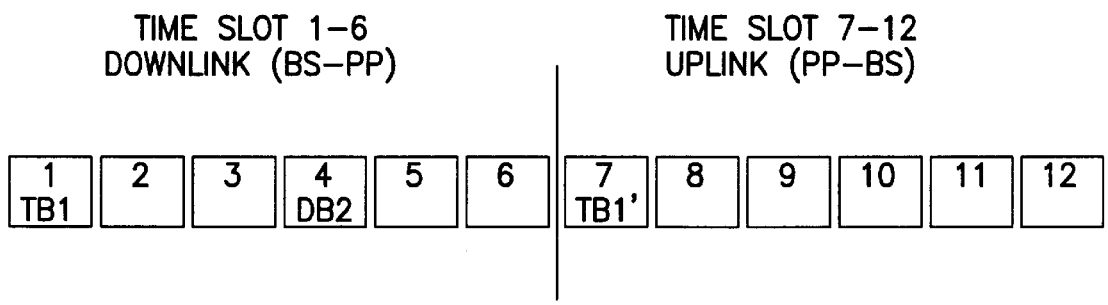
Figure 7C:
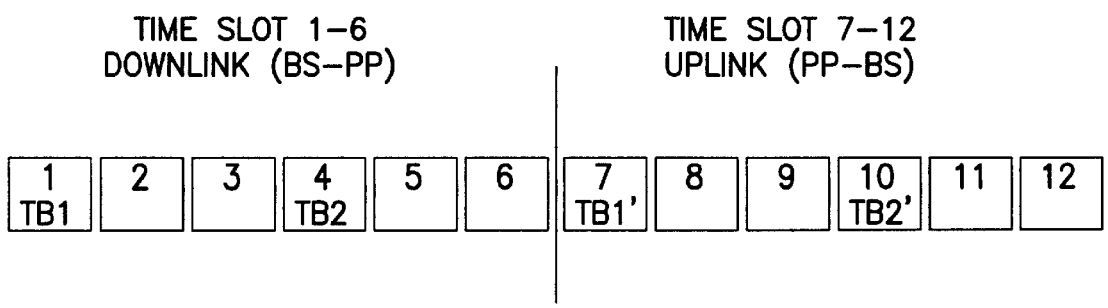
Figure 7D:
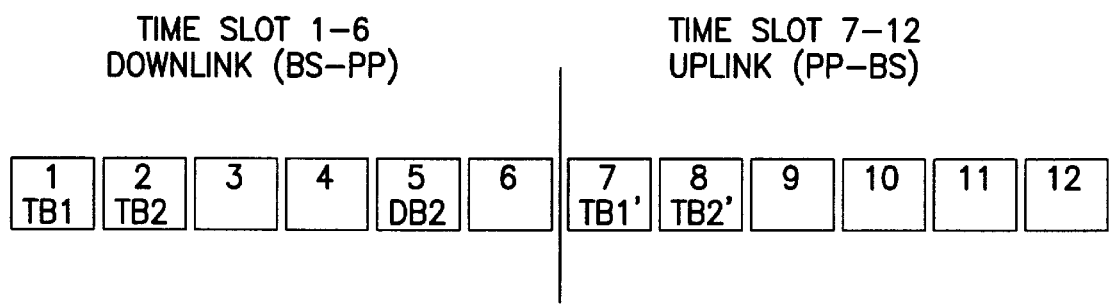
Figure 7E:
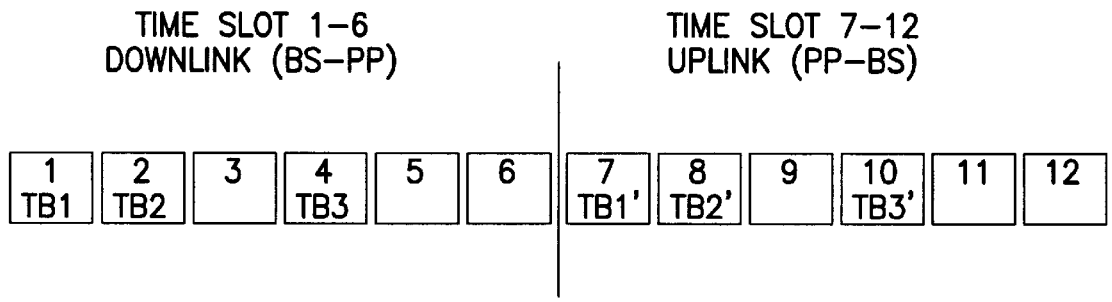

An exemplary embodiment of the invention is described in more detail below with reference to the appended drawings, in which:

FIG. 1 shows a cellular DECT telecommunications system according to the invention with two cells, FIG. 2 shows a block diagram of a base station for the cellular telecommunications system according to FIG. 1, FIG. 3 shows the cellular telecommunications system according to FIG. 1 with various possible ways of connecting the mobile stations, FIGS. 4a and 4b show the time slots which can be used by a slow synthesizer in the base station of a cellular telecommunications system according to FIG. 1, FIG. 5 shows the switching over of a channel in the cellular telecommunications system according to FIG. 1, FIG. 6 shows a flowchart for the switching over of a channel according to FIG. 5, FIG. 7a shows the time slots used in the telecommunications system according to FIG. 1 without an active call, FIG. 7b shows the time slots used in the telecommunications system according to FIG. 1 with an active call via antenna 1, FIG. 7c shows the time slots used in the telecommunications system according to FIG. 1 with two active calls in two cells, FIG. 7d shows the time slots used in the telecommunications system according to FIG. 1 with two active calls in one cell, and FIG. 7e shows the time slots used in the telecommunications system according to FIG. 1 with three active calls in two cells.

FIG. 1 shows a cellular DECT telecommunications system according to an exemplary embodiment of the invention with a first cell 1 and a second cell 2. Arranged in the first cell 1 is a base station 3 which is assigned to cells 1 and 2, optionally via respective antennas 4, 5.

A mobile station 6 which is located in the first cell 1 consequently communicates with the base station 3 via the antenna 4, while a mobile station 7 located in the second cell 2 is assigned to the base station 3 via the antenna 5.

As is shown in FIG. 1, the cells 1 and 2 overlap in a region 8 which can be assigned optionally to antenna 4 or to antenna 5.

The base station 3 and the antenna 4 are accommodated in a building 9. In this way, the interior of the building 9 is covered in terms of transmission and reception via the antenna 1, while the cell 2, which is located outside the building 9 (for example in the garden), is supplied via the antenna 5.

By means of this two-cell telecommunications system it is possible to set up connections between the mobile stations 6, 7 located in cell 1 and cell 2. It is therefore possible to telephone, for example, from the house to the garden, cells 1 and 2 being assigned only one common base station 3, which will be described in more detail below.

FIG. 2 shows a block diagram of the base station according to FIG. 1.

The base station 3 contains a switch 10, via which the antennas 4, 5 are optionally connected to a RF unit 11 also contained in the base station 3.

The switch 10 is controlled by a microcontrol unit (MCU) 12 which contains, inter alia, the MAC (Medium Access Control) layer according to the DECT Standard. The MAC layer takes over control functions for organizing the channels and is, as a rule, implemented as software in the MCU 12, but could also equally well be implemented as hardware.

In addition, the data or voice data from one or more trunk lines 13 of a digital network (ISDN) or an analog network (PSTN) is passed on to the RF unit 11 via the MCU 12.

The RF unit 11 contains the high-frequency components (transmitter and receiver) of the base station 3. The modulation and demodulation of the data are performed here, the RF unit being connected to this antenna as a function of the decision of the MCU 12 regarding which antenna is to be used for transmitting/receiving.

So that the RF unit 11 knows in which time slot and at which frequency the data have to be transmitted, the bursts with the information regarding the time slot to be used and regarding the frequency to a BMC (Burst Mode Controller) unit 14 are passed on by the MCU 12. The BMC 14 contains registers (not shown) in which the data are buffered. The data are then passed on to the RF unit 11 in the corresponding time slot. Parallel to this, the BMC 14 informs the RF unit 11 which transmission frequency is to be set for the transmission of these data. A so-called "low-cost" synthesizer 15 is arranged between the BMC 14 and the F unit 11.

The entire method proceeds similarly in the other direction. When the RF unit 11 has received and demodulated data, they are then passed via the BMC 14 to the MCU 12 and from there on to the trunk line 13.

For internal calls, the MCU 12 correspondingly receives the data via the RF unit 11 and the BMC 14, and shortly afterwards emits them again via the BMC 14 and the RF unit 11 in another time slot.

So that the MCU can carry out its functions, it has access to memory 16, which may be designed, for example, as ROM (Read Only Memory)16a or as RAM (Random Access Memory) 16b.

FIG. 2 also shows a clock generator 17 which specifies the working clock for the MCU 12 and possibly for other components.

In the application example according to FIG. 1, the antenna 4 is located, for example, in a flat, while the antenna 5 is arranged outside the building. The illustration in the block circuit diagram according to FIG. 2 shows that the connections of two ISDN trunk lines 13 to two mobile stations, of which one is connected to the antenna system 4 and the second to the antenna system 5, can be made, for example, via the base station 3 without using a second RF unit 11.

FIG. 3 shows the exemplary embodiment of the cellular telecommunications system according to FIG. 1 with various possible ways of connecting the mobile stations.

Here, there is, for example, a mobile station 18 in the cell 2, that is to say outside the building 3, the other mobile stations 19, 20, 21, 22 being located, for example, inside the building 3, that is to say in the cell 1.

As is shown in FIG. 3, the mobile stations 18, 19, 20 are connected to the base station 3. The base station 3 connects the mobile station 19 to a trunk line 13 (line call), while at the same time the mobile station 20 is connected to the mobile station 18 (intercom call) located in the other cell. The mobile stations 21, 22 are ready to transmit and receive and are receiving broadcast information via, for example, a dummy bearer transmitted into the cell 1.

In the scenario illustrated in FIG. 3, the base station 3 must in each case transmit a dummy bearer into each cell. Furthermore, the mobile station 3 must make available a bearer for the connection between the mobile station 19 and the trunk line 13 as well as two bearers for the connection between the mobile stations 20 and 18. Since it is possible for the mobile stations to move from one cell into another, a total of two bearers must be made available in each cell for a handover. This means that a maximum of seven bearers have to be generated simultaneously by the base station 3.

FIG. 4a shows the time slots which can be used by the "low-cost" synthesizer 15 of the base station 3 in the exemplary embodiment according to FIG. 1.

Since a "low-cost" synthesizer is very slow, it is not possible to change the frequency of two successive time slots. The result of this is that of the twelve time slots for the downlink (base station—mobile station) and uplink (mobile station—base station) defined in the DECT Standard, in each case only six time slots can be used, and these are illustrated in FIG. 4a in black.

Consequently, only a maximum of six bearers can be set up with the base station of the exemplary embodiment according to FIG. 1.

FIG. 4b shows the time slots according to FIG. 4a, the unusable time slots being omitted from the synthesizer.

As is shown in FIG. 4b, a first dummy bearer DB1 is set up in time slot 1, and a second dummy bearer DB2 is set up in time slot 4. Transferred to the cellular telecommunications system with two cells according to the invention, this means that there is no call active either in cell 1 or in cell 2. The time slots available in the downlink and uplink must be divided in accordance with the number of cells. This means that, in FIG. 4b, the time slots 1, 2 and 3 are assigned to cell 1, and time slots 4, 5 and 6 are assigned to cell 2. The same also applies to the uplink, that is to say to cells 7 to 12. Consequently, the dummy bearer DB1 is transmitted in time slot 1 via the antenna 1 into cell 1, while the dummy bearer DB2 is transmitted in time slot 4 via the antenna 2 into cell 2.

Since only six time slots are available for setting up a maximum of seven bearers, a special channel switch-over must be carried out in the cellar telecommunications system according to the invention.

FIG. 5 shows the channel switch-over in the cellular telecommunications system according to FIG. 1.

For the sake of explanation, only one traffic bearer TB is set up in FIG. 5, and is switched off again after a traffic bearer handover.

If there is no connection between the base station and the mobile stations, all the mobile stations in the idle locked stage (see DECT Standard) are synchronized to a dummy bearer DB transmitter by the base station. Said dummy bearer DB as a rule sends broadcast information to the mobile stations. The broadcast information contains, firstly, information specifying when the mobile stations must activate their receiver in each case (in which time slot and at what frequency), in order to determine whether there is a call for them, for example. On the other hand, via the broadcast channel, the mobile stations are informed in which time slot and at what frequency the next broadcast message will be transmitted.

As is shown by FIG. 5, after the set-up of a first traffic bearer TB, the dummy bearer DB is not switched off immediately but rather maintained for a further 640 milliseconds parallel to the traffic bearer TB. During this time, four multiframes with a length of 160 milliseconds each can be transmitted by the base station via the dummy bearer DB to all mobile stations synchronized to the dummy bearer DB, in order to inform said stations about the change of channel. Since the base station emits the broadcast information in each multiframe, the mobile stations activating their receiver every 640 milliseconds if no change is expected to the broadcast channel, it is possible to ensure in this way that all the mobile stations synchronized to the dummy bearer DB are informed about the change of channel.

After 640 milliseconds, the dummy bearer DB is switched off, in order to release immediately channels which are no longer necessary. The dummy bearer DB is, for this reason, now no longer necessary because all the mobile stations which were previously synchronized to the dummy bearer DB are now synchronized to the traffic bearer TB in which the broadcast information is also contained.

Furthermore, FIG. 5 shows a handover of a traffic bearer TB. Here, when a new traffic bearer TB is set up, the old traffic bearer TB is converted into a dummy bearer DB via which all the mobile stations synchronized to the old traffic bearer are informed about the handover.

The conversion of the traffic bearer TB into a dummy bearer DB is carried out here by switching off the voice transmission, in which case, according to the DECT layer method, only the U plane has to be disconnected. In order to ensure that all the mobile stations are also informed about the change of channel (handover), in this case also the dummy bearer DB is not switched off for 640 milliseconds.

FIG. 5 also shows the switching off of a last traffic bearer TB. For this purpose, said traffic bearer DB is converted into a dummy bearer DB, that is to say, as already mentioned, only the voice data transmission is stopped, it being possible for the channel of the last traffic bearer to be retained. After the conversion of the traffic bearer TB into the dummy bearer DB, all the mobile stations located in the idle locked state are then synchronized to the dummy bearer DB and receive the broadcast information via said dummy bearer DB again.

By virtue of the fact that a previously transmitted dummy bearer DB is switched off (after 640 milliseconds) when a first traffic bearer TB is set up, the channel occupied by the dummy bearer DB can be used in some other way. In this way, the maximum number of necessary bearers for the example according to FIG. 3 is reduced from seven bearers to five bearers. This makes it possible to implement the scenario described in FIG. 3 even using a cheap, slow synthesizer in a base station of a telecommunications system.

FIG. 6 shows the flow chart for switching over channels in a cellular telecommunications system in accordance with the invention according to FIG. 5. In said system, the following steps are carried out by the base station.

Step 1: broadcast/paging/system information is transmitted to all the synchronized mobile stations via the DB, no traffic bearers TB being active.

Step 2: if no traffic bearer is requested by a mobile station or even a base station, a jump back to step 1 takes place, so that the dummy bearer DB is transmitted again. If, on the other hand, a traffic bearer TB request is present, the flow chart is continued at step 3.

Steps 3 to 8 describe the procedure for switching off the dummy bearer DB.

Step 3: a counter i is set to 0.

Step 4: there is the selection of a suitable channel on which the traffic bearer TB is transmitted by the base station and which contains the broadcast/paging/system information for the mobile stations.

Step 5: the dummy bearer DB from step 1 continues to be transmitted; it contains information specifying onto which channel the mobile stations have to switch themselves in order to continue to receive broadcast/paging/system information. At the same time, the broadcasting of the new traffic bearer TB takes place from this time onwards.

Step 6: if the counter i has the value 4, the system branches to step 8. If the value of i=4 has not yet been reached, the flow chart is continued at step 7.

Step 7: jump back to step 5 after the counter i has been incremented by 1.

This counter loop is run through every 160 milliseconds, which corresponds to the time for one multiframe. If the loop is therefore run through four times, it is thus ensured that all the mobile stations have been informed at least once about the change of channel. After the message has been received, the mobile stations switch to the traffic bearer TB, since the mobile stations have listened into the signals from the base station at least once during a frame which is 640 milliseconds long.

Step 8: the dummy bearer DB is now switched off, since the traffic bearer also broadcasts the necessary broadcast information to the mobile stations which do not require any traffic bearer TB at the moment. Step 9: if a traffic bearer continues to be required, if therefore a "line call" or "intercom call", for example, is being carried out, the system branches to step 10. If no traffic bearer is required, the flow chart is continued at step 11.

Step 10: further broadcasting of the traffic bearer with the broadcast/paging/system information and branching to step 9.

Step 11: since no traffic bearer TB is required any more, the traffic bearer TB can be converted into a dummy bearer TB again, the flow chart starting at step 1 again.

FIGS. 7a to 7e show the time slots which are used, in various cases, by the base station of an inventive cellular telecommunications system according to FIG. 1, and in which slots the respective bearers are transmitted via corresponding antennas 4, 5.

Customarily, during the system initialization each cell is assigned a predetermined number of time slots (channels). During the following consideration, the important factor is not which time slot is assigned to which cell, since only the number of assigned cells is significant.

In FIGS. 7a to 7c and 7e, in each case the time slots 1 to 3 (7 to 9) are assigned to cell 1, and the time slots 4 to 6 (10 to 12) are assigned to cell 2. The channel assignment and/or the switching over between the antennas 4 and 5 will be explained with reference to the following examples.

FIG. 7a shows a case in which no active call is set up in cells 1 and 2.

After the initialization of the telecommunications system, a dummy bearer DB1, DB2 is transmitted in each of the two cells. As shown by FIG. 7a, the DB1 is transmitted in time slot 1 via the antenna 4, and the DB2 is transmitted in time slot 4 via the antenna 5.

By means of the time slots 7 to 12, the mobile stations can transmit data to the base station, either via the antenna 4 or the antenna 5. According to FIG. 7a, the following channel distribution takes place after the initialization of the system:

Cell 1: 3/1/2 Cell 2: 3/1/2 Total: 6/2/4

Here, 3/1/2 means that three time slots are available in total; one time slot is used and two time slots are free.

FIG. 7b shows a second case in which an active call is made via antenna 4.

After conversion and switching-off of the DB1 to form TB1, the latter is transmitted in time slot 1 via the antenna 4. Actually, TB1 would have to be transmitted in time slot 2 or 3, since it is already set up when DB1 is still present. However, since, in principle, it does not matter which time slot transmission takes place in, for the sake of simplicity transmission takes place in time slot 1. This also applies to all the following examples.

DB2 will continue to be transmitted in time slot 4 via the antenna 5, while TB1', which constitutes the opposing channel to TB1, is received on the uplink side via the antenna 4.

The case shown in FIG. 7b occurs, for example, when a mobile station is connected to a trunk line.

According to FIG. 7b, the following channel distribution occurs:

| Set up 1 TB 640 ms ↓ | Cell 1: 3/2/1 | Cell 2: 3/1/2 | Total: 6/3/3 |
|---|---|---|---|
| Switch off 1 DB | Cell 1: 3/1/2 | Cell 2: 3/1/2 | Total: 6/2/4 |

FIG. 7c shows a third case in which two active calls are set up in two cells (antenna 4 and antenna 5).

Such a case occurs, for example, when in each case one mobile station in each cell is connected to one trunk line, or when two mobile stations which are in different cells are connected tb one another (two line calls or one intercom call).

The assignment of time slots shown in FIG. 7c occurs after the DB1 and DB2 have each inverted into a TB2. As shown in the figure, TB1 is transmitted in time slot 1 via the antenna 4, while TB2 is transmitted in time slot 4 via the antenna 5. On the uplink side, the antenna 4 receives TB1' in time slot 7, the antenna 5 receiving the TB2' in time slot 10.

According to FIG. 7c, the following channel distribution occurs:

| Set up 2 TB 640 ms ↓ | Cell 1: 3/2/1 | Cell 2: 3/2/1 | Total: 6/4/2 |
|---|---|---|---|
| Switch off 2 DB | Cell 1: 3/1/2 | Cell 2: 3/1/2 | Total: 6/2/4 |

FIG. 7d shows a fourth case in which two active calls are set up in one cell (antenna 4).

Taking as a basis case 3 in which, for example, there is an intercom call between two mobile stations, one of which is in cell 2 (garden) and one in cell 1 (house), such a case could occur if, for example, a mobile station is moved from the garden into the house. Consequently, two TB (TB1, TB2) have to be set up in cell 1 and one DB2 in cell 2. Since cell 1 is assigned only three time slots, two time slots would therefore already be seized by the traffic bearers TB1, TB2, as a result of which it would no longer be possible to make an intercom call within cell 1, for example. For this reason, cell 1 borrows a time slot from cell 2 in which there is no active connection set up at the time. The lending of the time slots is administered by the MCU 12.

Consequently, in FIG. 7d, time slots 1 to 4 (7 to 10) are assigned to cell 1, TB1 being transmitted submitted in time slot 1 via antenna 4, TB2 being transmitted in time slot 2 via antenna 4, and DB2 being transmitted in time slot 5 via antenna 5. Correspondingly, TB1' is received in time slot 1 via antenna 4, and TB2' is received in time slot 8 via antenna 4.

If the two traffic bearers TB1, TB2 are set up successively in a cell 1 within 640 milliseconds, the following channel assignment is obtained:

| | | | |
|---|---|---|---|
| Set up 1 TB | Cell 1: 3/2/1 | Cell 2: 3/1/2 | Total: 6/3/3 |
| 640 ms + Setup 1 TB ↓ | Cell 1: 3/3/0 | Cell 2: 3/1/2 | Total: 6/4/2 |
| Δ Resource | Cell 1: 4/3/1 | Cell 2: 2/1/1 | Total: 6/4/2 |
| Switch off 1 DB | Cell 1: 4/2/2 | Cell 2: 2/1/1 | Total: 6/3/3 |

If the second traffic bearer is not set up until after 640 milliseconds, the following channel assignment is obtained:

| | | | |
|---|---|---|---|
| Set up 1 TB | Cell 1: 3/2/1 | Cell 2: 3/1/2 | Total: 6/3/3 |
| 640 ms ↓ Switch off 1 DB | Cell 1: 3/1/2 | Cell 2: 3/1/2 | Total: 6/2/4 |
| Set up 1 TB | Cell 1: 3/2/1 | Cell 2: 3/1/2 | Total: 6/3/3 |

FIG. 7e shows a fifth case in which three active calls are set up in two cells (antenna 4 and antenna 5). In FIG. 7e, in contrast to FIG. 7d, the first three time slots are again assigned to cell 1. When there are three active calls in two cells, a total of three traffic bearers TB1, TB2, TB3 are set up. As can be seen in FIG. 7e, TB1 is transmitted in time slot 1 via antenna 4, TB2 in time slot 2 via antenna 4 and TB3 in time slot 3 via antenna 5. Correspondingly, TB1' is received in time slot 7 via antenna 4, TB2' in time slot 8 via antenna 4, and TB3' in time slot 10 via antenna 5. Such a case, in which three active calls are set up in two cells, could arise, for example, in the case of an intercom call (garden—house) and a line call (house—trunk line). When two traffic bearers are set up in parallel in two cells, and a third traffic bearer set up within 640 milliseconds, the following channel assignment is obtained:

| | | | |
|---|---|---|---|
| Set up 2 TB ↓ | Cell 1: 3/2/1 | Cell 2: 3/2/1 | Total: 6/4/2 |
| 640 ms + Setup 1 TB | Cell 1: 3/3/0 | Cell 2: 3/2/1 | Total: 6/5/1 |
| Switch off 2 DB | Cell 1: 3/2/1 | Cell 2: 3/1/2 | Total: 6/3/3 |

The exemplary embodiment of the invention described above relates primarily to a DECT telecommunications system, but the cellular telecommunications system according to the invention can also be applied to other telecommunications standards.

What is claimed is:

1. Cellular telecommunications system having n cells, each of which is assigned an antenna via which a base station can transmit and receive, characterized in that:

all n cells are assigned only one common base station with n antennas which can be switched over, $n \geq 2$, the n antennas are further characterized in that each antenna is assigned different transmit and receive communication time slots;

a bearer transmitted on a first channel contains information relating to the position of a second channel, so that a mobile station within any cell of the n cells can set itself to the second channel using this information, and wherein said position information is transmitted parallel to a traffic bearer which has been set up on the second channel; and wherein said system is further characterized in that, when the last traffic bearer is switched off, said traffic bearer is converted to a permanent dummy bearer.

* * * * *